(12) United States Patent
Harrup et al.

(10) Patent No.: US 7,458,433 B2
(45) Date of Patent: Dec. 2, 2008

(54) ELECTRIC MOTOR AND GEAR DRIVE ASSEMBLY FOR DRIVING A VEHICLE WHEEL

(75) Inventors: Clive Harrup, Bromham (GB); Dale K. Bell, Ortonville, MI (US); Dennis A. Kramer, Troy, MI (US); Mehmet S. Ciray, Glenwood, IN (US); Silvio M. Yamada, Waterford, MI (US); Dean M. House, Pataskala, OH (US); David K. Platner, Shelby, MI (US); Dale J. Eschenburg, Clinton Township, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 855 days.

(21) Appl. No.: 10/631,495

(22) Filed: Jul. 31, 2003

(65) Prior Publication Data

US 2005/0023056 A1    Feb. 3, 2005

(51) Int. Cl.
    *B60K 1/00* (2006.01)
(52) U.S. Cl. .................................... 180/65.2; 180/65.6
(58) Field of Classification Search ................ 180/65.2, 180/65.5, 65.6, 6.5, 214
    See application file for complete search history.

(56) References Cited

U.S. PATENT DOCUMENTS

| 3,570,620 | A | * | 3/1971 | Fisher et al. | 180/214 |
|---|---|---|---|---|---|
| 3,613,813 | A | * | 10/1971 | Biddle | 180/6.5 |
| 3,684,046 | A | * | 8/1972 | Begleiter | 180/214 |
| 3,686,978 | A | * | 8/1972 | Knoblach et al. | 475/296 |
| 3,737,000 | A | * | 6/1973 | Knobloch et al. | 180/369 |
| 3,770,074 | A | * | 11/1973 | Sherman | 180/65.6 |
| 4,043,226 | A | * | 8/1977 | Buuck | 475/158 |
| 4,050,331 | A | | 9/1977 | Braren | |
| 4,297,920 | A | | 11/1981 | Richter | |
| 4,399,883 | A | * | 8/1983 | Todokoro | 180/65.6 |
| 4,702,126 | A | | 10/1987 | Nakamura | |
| 4,979,582 | A | | 12/1990 | Forster | |
| 5,382,854 | A | | 1/1995 | Kawamoto et al. | |
| 5,442,901 | A | * | 8/1995 | Niemela et al. | 56/11.9 |
| 5,691,584 | A | | 11/1997 | Toida et al. | |
| 6,080,077 | A | | 6/2000 | Kamlukin | |
| 6,732,526 | B2 | * | 5/2004 | Minagawa et al. | 60/706 |
| 6,863,141 | B2 | * | 3/2005 | Weisz | 180/65.5 |

FOREIGN PATENT DOCUMENTS

| EP | 0 161 072 B1 | 9/1988 |
|---|---|---|
| EP | 0 708 271 B1 | 12/1998 |
| EP | 1 038 715 | 9/2000 |
| FR | 1 261 630 | 5/1961 |
| GB | 1 517 112 | 7/1978 |

* cited by examiner

*Primary Examiner*—Paul N. Dickson
*Assistant Examiner*—Bridget Avery
(74) *Attorney, Agent, or Firm*—Carlson, Gaskey & Olds (57) ABSTRACT

A drive unit assembly for a vehicle wheel includes a rigidly mounted electric motor coupled to the vehicle wheel via a gear drive. The gear drive includes a cycloid or epicycloid gear arrangement that provides significant speed reduction at the wheel.

8 Claims, 4 Drawing Sheets

ELECTRIC MOTOR AND GEAR DRIVE ASSEMBLY FOR DRIVING A VEHICLE WHEEL

BACKGROUND OF THE INVENTION

This invention generally relates to a drive unit assembly with an electric motor and gear drive arrangement for driving a vehicle wheel.

Conventional automotive vehicles have been powered by an internal combustion engine that provides driving torque to one or more sets of wheels to propel the vehicle as desired. Recent trends have included incorporating other sources of motive power in place of, or as a supplement to, the internal combustion engine. One such example is an electric hybrid vehicle that utilizes internal combustion engine power and electric power. One shortcoming of such alternative power arrangements is that the potential benefits are limited by the ability to incorporate such systems onto a vehicle. Designs accommodating alternative power sources are typically heavily dependent on current vehicle component configurations. Packaging space is limited and the various component design requirements present serious challenges to effective integration of alternative drive arrangements.

There is a need for alternative arrangements of supplemental or alternative power devices on vehicles so that appropriate control can be accomplished within vehicle packaging constraints. This invention addresses that need and provides a unique arrangement for providing driving torque to one or more wheels of a vehicle.

SUMMARY OF THE INVENTION

A drive unit assembly for a vehicle wheel includes a rigidly mounted electric motor for driving a vehicle wheel via a gear drive. The gear drive includes at least a first gear component in driving engagement with a second gear component. The second gear component is operably coupled to drive the vehicle wheel. The gear drive includes a cycloid or epicycloid gear arrangement that provides significant speed reduction at the vehicle wheel. One electric motor can be used to drive multiple vehicle wheels or multiple electric motors can be used, with one electric motor mounted to drive each wheel independently from the other wheels.

In one disclosed embodiment, the electric motor includes a motor casing and motor output shaft that drives the gear drive. The gear drive defines a gear drive axis that is non-concentric with the motor output shaft. The motor casing is mounted to a non-rotating vehicle component, such as a suspension component, for example. The motor output shaft is preferably coaxial with the vehicle wheel.

In one disclosed embodiment, the gear drive comprises a cycloid gear configuration. In the cycloid gear configuration, the first gear component comprises a first cycloid member having a central bore for receiving and rotatably supporting an eccentric cam that is mounted for rotation with the motor output shaft and a plurality of circumferential bores spaced radially about a circumference of the first cycloid member relative to the central bore. The second gear component comprises a second cycloid member fixed to the wheel. The second cycloid member includes a plurality of drive members spaced about a circumference of the second cycloid member with each one of the drive members being received in a corresponding one of the circumferential bores. The motor output shaft is non-concentric with the central bore and each of the drive members is non-concentric with their respective circumferential bore. The eccentric cam drives the second cycloid member via the first cycloid member to achieve speed reduction at the wheel.

In another disclosed embodiment, the gear drive comprises an epicycloid gear configuration. In the epicycloid gear configuration, the first gear component comprises a non-rotating ring gear and the second gear component comprises a drive gear in driving engagement with the ring gear. The drive gear is coupled to the motor output shaft to receive driving input, and is coupled to the wheel to provide driving output to the wheel. A chain and sprocket drive interconnects the motor output shaft and the drive gear.

The combination of the gear drive and electric motor can easily provide speed reduction ratios of twenty to one and can even achieve speed reduction ratios as high as one hundred and seventy-nine to one. Thus, the subject invention provides a viable electric drive unit assembly for a vehicle wheel. These and other features of the present invention can be best understood from the following specifications and drawings, the following of which is a brief description.

DETAILED DESCRIPTION OF A PREFERRED EMBODIMENT

Figure 1:
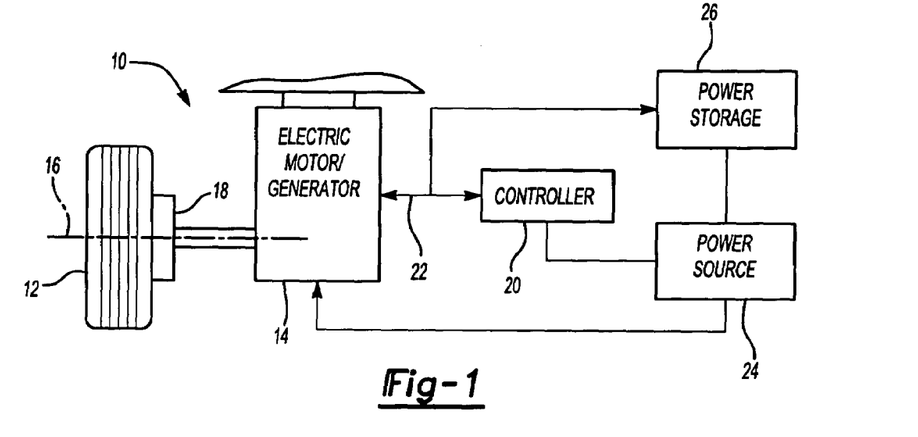
FIG. 1 is a schematic view of a vehicle wheel assembly driven by a drive unit and control system that incorporates the subject invention.

A drive unit assembly 10 for a vehicle wheel 12 is shown in FIG. 1. The drive unit assembly 10 includes a rigidly mounted electric motor 14 that drives the vehicle wheel 12 about a lateral axis of rotation 16 via a gear drive 18. A controller 20 controls the electric motor 14 with a control signal 22. A power source 24, such as a vehicle battery or other similar source, provides power to the controller 20 and electric motor 14.

The electric motor 14 is used to directly drive the vehicle wheel 12 and can be used either alone or in conjunction with a conventional internal combustion powertrain. Further, the drive unit assembly 10 could also serve as a retarding mechanism for the vehicle where power generated could be collected and stored in a power storage device 26 for subsequent use by the electric motor 14.

Figure 2A:
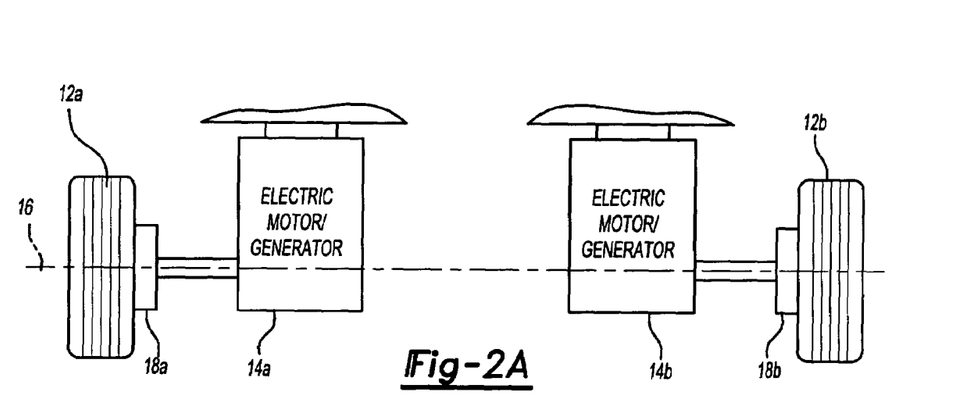
FIG. 2A is a schematic view of one embodiment of the vehicle wheel assembly and drive unit of the control system of FIG. 1.

As shown in FIG. 2A, separate electric motors 14a, 14b can be used to drive the vehicle wheels 12. In this configuration, a first electric motor 14a drives a first vehicle wheel 12a, positioned on one side of the vehicle, and a second electric motor 14b drives a second vehicle wheel 12b, laterally spaced from the first vehicle wheel 12a, and positioned on an opposite side of the vehicle. The first 12a and second 12b vehicle wheels both rotate about the lateral axis of rotation 16 and each include a gear drive 18. The first electric motor 14a drives the first vehicle wheel 12a via a first gear drive 18a, and the second electric motor 14b drives the second vehicle wheel 12b via a second gear drive 18b. The first 14a and second 14b electric motors operate independently from each other but can be controlled from a common controller 20.

Figure 2B:
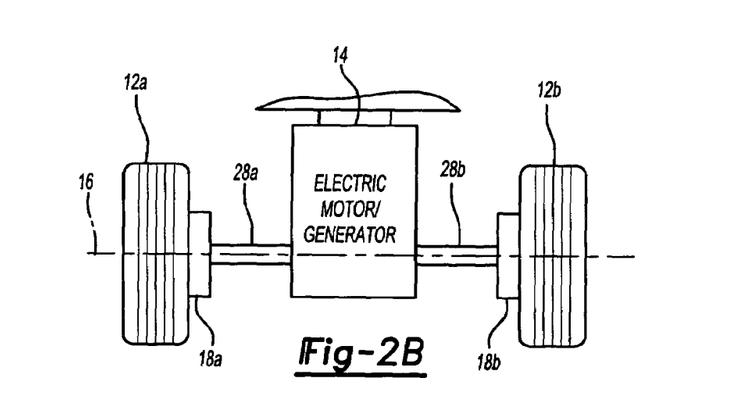
FIG. 2B is a schematic view of an alternate embodiment of the vehicle wheel assembly and drive unit of the control system of FIG. 1.

As shown in FIG. 2B, a single electric motor 14 can be used to drive both the first 12a and second 12b vehicle wheels about the lateral axis of rotation 16. Each vehicle wheel 12a, 12b includes a respective gear drive 18a, 18b as described above. In this configuration, the electric motor 14 would include at least two outputs 28a, 28b for driving each respective vehicle wheel 12a, 12b.

As discussed above, each of the vehicle wheels 12 includes a gear drive 18. The gear drive 18 is needed to provide speed reduction from the relatively high-speed output from the electric motor 14 to a lower wheel speed. The gear drive 18 is preferably either a cycloid gear drive 30, shown in FIGS. 3 and 4 or an epicycloid gear drive 32, shown in FIGS. 5, 6, and 7. The use of these gear configurations allows the electric motor 14 to be rigidly mounted to the vehicle and provides a reduction to get the speed and torque levels necessary for desired vehicle propulsion. Reduction ratios of twenty to one are easily achieved with these configurations, and ratios as high as one hundred and seventy-nine to one may be achieved.

Figure 3:
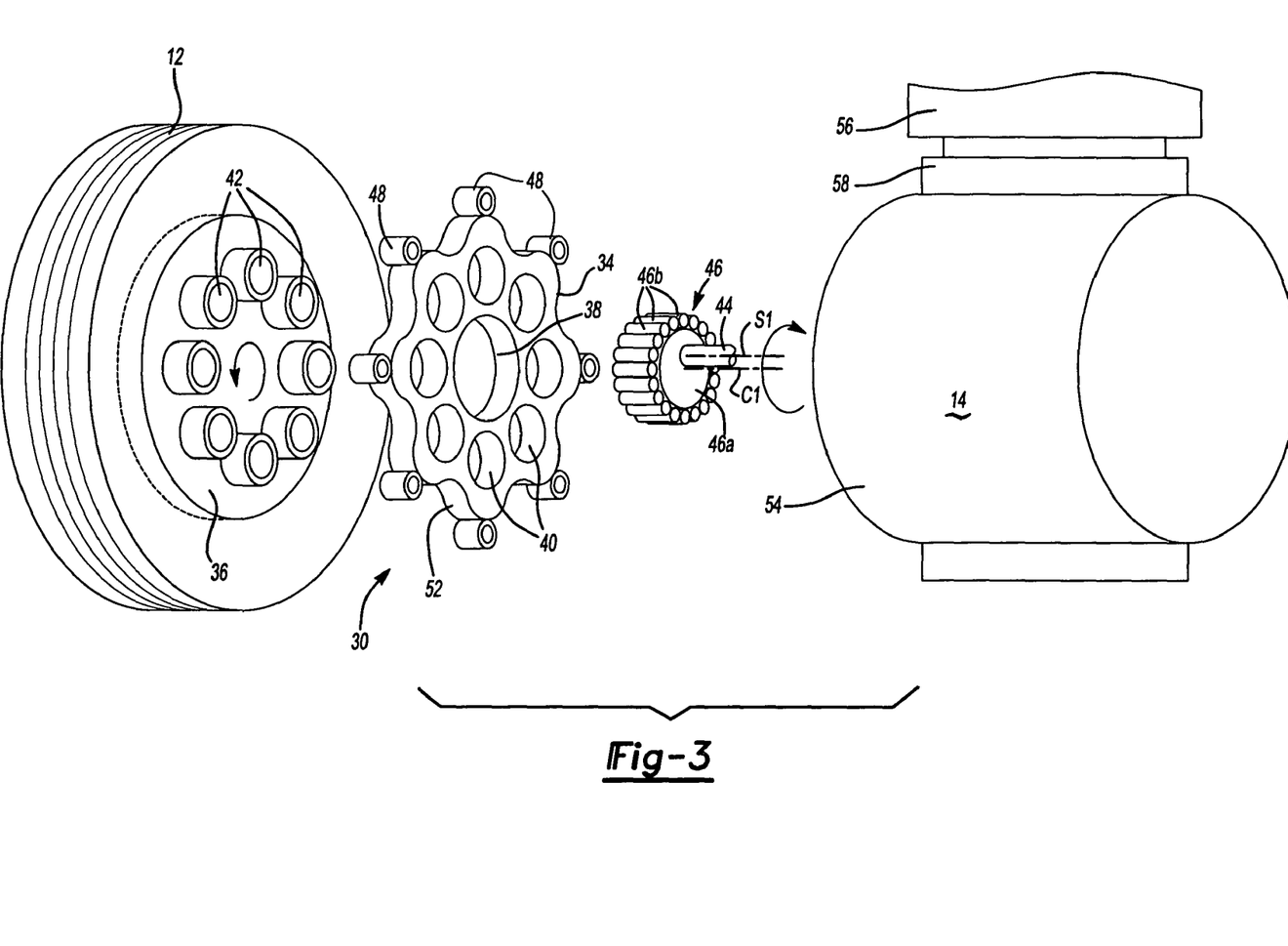
FIG. 3 is an exploded view of a cycloid gear drive incorporated into the drive units of FIGS. 1, 2A, or 2B.

The cycloid gear drive 30 of FIG. 3 includes a first cycloid gear component 34 that cooperates with a second cycloid gear component 36, which is fixed for rotation with the vehicle wheel 12. The first cycloid gear component 34 preferably comprises a cycloid disc that has a center bore 38 and a plurality of circumferential bores 40 radially spaced about the circumference relative to the center bore 38. The second cycloid gear component 36 includes a plurality of drive members 42 radially spaced about the circumference of the second cycloid gear component 36. One drive member 42 is received in each circumferential bore 40.

The electric motor 14 includes a motor output shaft 44 that is received within the center bore 38. An eccentric cam and bearing pack assembly 46 is mounted on one end of the motor output shaft 44 to rotatably support the first cycloid gear component 34. The eccentric cam and bearing pack assembly 46 includes an eccentric cam member 46a that defines a cam centerline C1 and includes a plurality of bearing members 46b that cooperate with the outer circumference of the eccentric cam member 46a. The eccentric cam member 46a is either integrally formed on an end of the motor output shaft 44 or separately mounted for rotation with the motor output shaft 44. The motor output shaft 44 defines a shaft centerline S1 that is parallel to and spaced apart from the cam centerline C1, i.e., the shaft centerline S1 is non-concentric with the cam centerline C1.

A plurality of reaction members 48 are held fixed relative to the first 34 and second 36 cycloid gear components. The reaction members 48 are preferably mounted to a non-rotating vehicle structure 50, such as a wheel end housing, frame, ring gear or other similar structure. The first cycloid gear component 34 includes a scalloped or wave-shaped outer circumference surface 52 that defines a cycloidal profile. As the motor output shaft 44 drives the first cycloid gear component 34, the wave-shaped outer circumference surface 52 rolls against the reaction members 48.

Figure 4:
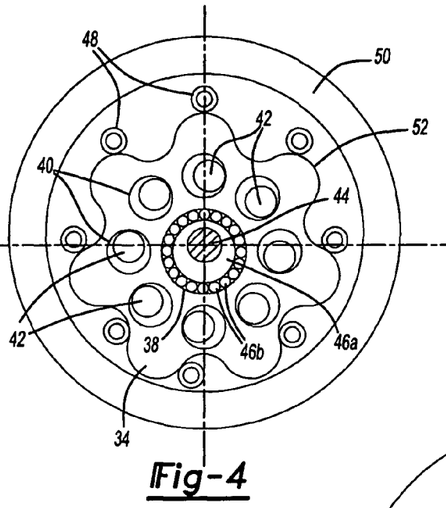
FIG. 4 is a side view, showing a motor output shaft in cross-section, of the cycloid gear drive of FIG. 3.

A cycloid curve is generated by a point on the circumference of a circle as the point rolls along a straight line. In the cycloid gear drive 30 of the subject invention, the motor output shaft 44 is non-concentric with the center bore 38. Further, the drive members 42 are non-concentric with the circumferential bores 40, as shown in FIG. 4. The motor output shaft 44 and the lateral axis of rotation 16 are concentric. As the first cycloid gear component 34 reacts against reaction members 48 via the wave-shaped outer circumference surface 52, the circumferential bores 40 react against the drive members 42, which drives the vehicle wheel 12 at the desired speed about the lateral axis of rotation 16. The cycloid gear drive 30 provides speed reduction from the input of the high-speed motor output shaft 44 to the output at the vehicle wheel 12.

As the eccentric cam member 46a is driven by the high speed motor output shaft 44, the first cycloid gear component 34 is forced to rotate around an internal circumference of the non-rotating vehicle structure 50. As the first cycloid gear component 34 rotates in a clockwise direction relative to the non-rotating vehicle structure 50, the wheel 12 rotates about axis 16 in a counter-clockwise direction. The outer circumference surface 52 with the cycloidal profile engages progressively with the reaction members 48 fixed to the non-rotating vehicle structure to produce a reverse rotation at a reduced speed. For each complete revolution of the motor output shaft 44, the first cycloid gear component 34 turns one cycloidal tooth pitch in the opposite direction. Preferably, there is one less cycloidal tooth round the first cycloid gear component 34 than there are reaction members 48 to achieve reduction ratios that are equal to the number of cycloidal teeth, however, other combinations could be used. The reduced rotation of the first cycloid gear component 34 is transmitted to the drive members 42 that engage the circumferential bores 40.

The electric motor 14 includes a housing or casing 54 that is fixed to a suspension component 56 or other similar vehicle structure via a motor mount 58. Due to the speed reduction provided by the cycloid gear drive 30, the electric motor 14 can be rigidly mounted at the vehicle wheel 12 and does not require further speed reducing structure.

Optionally, the epicycloid gear drive 32 can be used to provide speed reduction at the vehicle wheel 12. An epicycloid is defined as a carve traced by a point on a circle that rolls on the outside of a fixed circle. The epicycloid gear drive 32 of FIG. 5 includes a non-rotating ring gear 60, fixed to the casing 54 or other non-rotating vehicle component, and a drive gear 62 fixed to the vehicle wheel 12. The drive gear 62 includes a first plurality of teeth 66 that are in direct meshing engagement with a second plurality of teeth 68 formed on the ring gear 60. A chain and sprocket drive 70 interconnects the motor output shaft 44 to the drive gear 62. The electric motor 14 is rigidly mounted to the suspension component 56.

Figure 5:
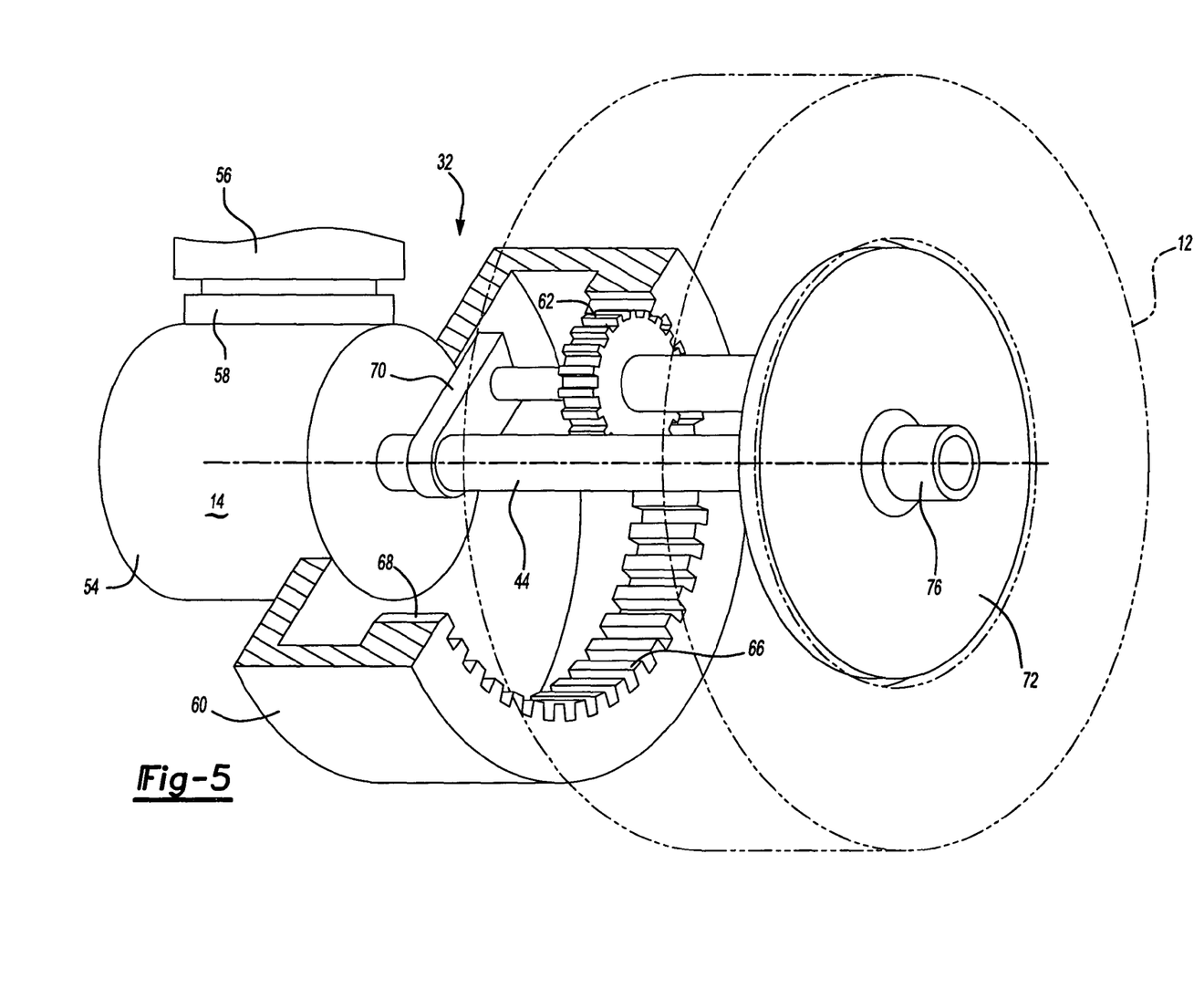
FIG. 5 is a perspective view of an epicycloid gear drive incorporated into the drive units of FIGS. 1, 2A, or 2B.
Figure 6:
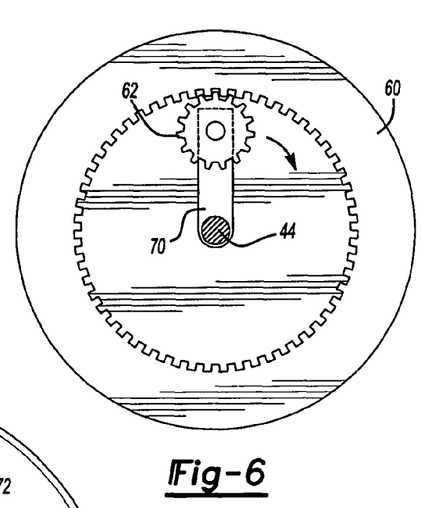
FIG. 6 is a schematic side view of the ring and drive gears of the epicycloid gear drive of FIG. 5.
Figure 7:
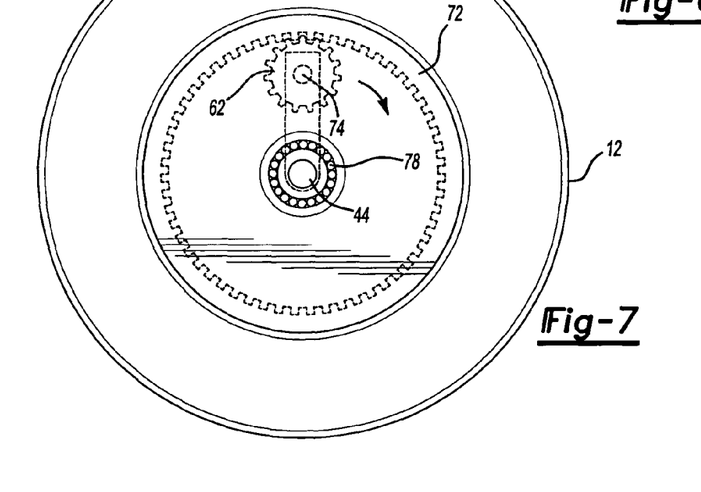
FIG. 7 is a schematic side view of the wheel and drive gear of the epicycloid gear drive of FIG. 5.

The ring gear 60 and motor output shaft 44 are concentric and the drive gear 62 and motor output shaft 44 are non-concentric. The motor output shaft 44 drives the chain and sprocket drive 70, which drives the drive gear 62 within the ring gear 60. The drive gear 62 is fixed to a wheel disc 72 or other similar member via a connector member 74. The vehicle wheel 12 is fixed for direct rotation with the wheel disc 72. The wheel disc 72 includes a cup portion 76 that receives and supports the motor output shaft 44 on a bearing pack 78.

The combination of the gear drive 18 and electric motor 14 easily provides significant speed reduction ratios. Thus, the subject invention provides a viable electric power wheel drive option by using the subject drive unit assembly 10 with a rigidly mounted electric motor 14. Although a preferred embodiment of this invention has been disclosed, a worker of ordinary skill in this art would recognize that certain modifications would come within the scope of this invention. For that reason, the following claims should be studied to determine the true scope and content of this invention.

The invention claimed is:

1. A drive unit assembly for a vehicle wheel comprising:
   a gear drive comprising an epicycloid gear reduction that defines a gear drive axis, said gear drive having at least a first gear component and a second gear component, said second gear component being driven by said first gear component and being attachable to a wheel to drive the wheel about an axis of rotation;
   an electric motor including a motor output shaft that is non-concentric with said gear drive axis and is coaxial with the axis of rotation wherein said motor output shaft is operably coupled to said gear drive to provide a driving input to the wheel, and wherein said motor output shaft rotates at a first rotational speed and the wheel rotates at a second rotational speed less than said first rotational speed;
   said first gear component comprising a non-rotating ring gear and said second gear component comprising a drive gear that defines said gear drive axis and is in driving engagement with said ring gear, said drive gear operably coupled to said motor output shaft to receive driving input and operably coupled to the wheel to provide driving output; and
   a chain and sprocket drive interconnecting said motor output shaft and said drive gear.

2. The assembly as set forth in claim 1 wherein a rotational speed reduction between said first rotational speed and said second rotational speed is a ratio of at least twenty to one.

3. The assembly as set forth in claim 1 wherein said electric motor includes a motor casing rigidly mountable to a vehicle suspension.

4. A drive unit assembly for driving at least two laterally spaced wheels on opposing sides of a vehicle comprising:
   a first gear drive defining a first gear drive axis and having at least a first gear component and a second gear component, said second gear component in driving engagement with said first gear component and operably engageable with a first wheel to drive the first wheel about a lateral axis of rotation;
   a second gear drive defining a second gear drive axis and having at least a third gear component and a fourth gear component, said fourth gear component in driving engagement with said third gear component and operably engageable with a second wheel to drive the second wheel about the lateral axis of rotation; and
   at least one electric motor output having a motor output that is non-concentric with said first and second gear drive axes and that is coaxial with the lateral axis of rotation wherein said motor output is operably coupled to said first and second gear drives to provide a driving input to the first and second wheels.

5. The assembly as set forth in claim 4 wherein said at least one electric motor comprises a single electric motor for driving both the first and second wheels, said single electric motor including a first motor output shaft that is non-concentric with said first gear drive axis and a second motor output shaft that is non-concentric with said second gear drive axis, said first motor output shaft in driving engagement with said first gear component and said second motor output shaft in driving engagement with said third gear component.

6. The assembly as set forth in claim 4 including at least one suspension component mountable to a non-rotating vehicle structure wherein said electric motor is rigidly mounted to said suspension component.

7. The assembly as set forth in claim 4 wherein said motor output of said electric motor comprises first and second motor output shafts each being coaxial with the lateral axis of rotation for rotating at a first rotational speed and wherein the first and second wheels rotate at a second rotational speed that is less than said first rotational speed.

8. The assembly as set forth in claim 7 wherein said first and second gear drives each comprise an epicycloid gear reduction with said first and third gear components each comprising a non-rotating ring gear and said second and fourth gear components each comprising a drive gear that defines said first and said second gear drive axes, respectively, said drive gear being in driving engagement with said ring gear, and said drive gear being operably coupled to said motor output via a chain and sprocket assembly to receive driving input and operably coupled to the respective first or second wheel to provide driving output.

* * * * *

(12) EX PARTE REEXAMINATION CERTIFICATE (10059th)
United States Patent
Harrup et al.

(10) Number: US 7,458,433 C1
(45) Certificate Issued: Feb. 27, 2014

(54) ELECTRIC MOTOR AND GEAR DRIVE ASSEMBLY FOR DRIVING A VEHICLE WHEEL

(75) Inventors: Clive Harrup, Bromham (GB); Dale K. Bell, Ortonville, MI (US); Dennis A. Kramer, Troy, MI (US); Mehmet S. Ciray, Glenwood, IN (US); Silvio M. Yamada, Waterford, MI (US); Dean M. House, Pataskala, OH (US); David K. Platner, Shelby, MI (US); Dale J. Eschenburg, Clinton Township, MI (US)

(73) Assignee: JPMorgan Chase Bank, N.A., Chicago, IL (US)

Reexamination Request:
No. 90/012,823, Mar. 29, 2013

Reexamination Certificate for:
Patent No.: 7,458,433
Issued: Dec. 2, 2008
Appl. No.: 10/631,495
Filed: Jul. 31, 2003

(51) Int. Cl.
*B60K 1/00* (2006.01)

(52) U.S. Cl.
USPC ............ 180/65.6; 180/65.245; 903/906

(58) Field of Classification Search
None
See application file for complete search history.

(56) References Cited

To view the complete listing of prior art documents cited during the proceeding for Reexamination Control Number 90/012,823, please refer to the USPTO's public Patent Application Information Retrieval (PAIR) system under the Display References tab.

*Primary Examiner* — William Doerrler (57) ABSTRACT

A drive unit assembly for a vehicle wheel includes a rigidly mounted electric motor coupled to the vehicle wheel via a gear drive. The gear drive includes a cycloid or epicycloid gear arrangement that provides significant speed reduction at the wheel.

US 7,458,433 C1

EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 4 and 8 are determined to be patentable as amended.

Claims 5-7, dependent on an amended claim, are determined to be patentable.

New claims 9-17 are added and determined to be patentable.

Claims 1-3 were not reexamined.

4. A drive unit assembly for driving at least two laterally spaced wheels on opposing sides of a vehicle comprising:
a first gear drive defining a first gear drive axis and having at least a first gear component and a second gear component, said second gear component in driving engagement with said first gear component and operably engageable *and fixed for rotation* with a first wheel to drive the first wheel about a lateral axis of rotation, *wherein the first gear component is a disc having a center bore and a plurality of circumferential bores radially spaced about a circumference of the disc relative to the center bore, wherein the first gear drive has a plurality of reaction members mounted to an internal circumference of a non-rotating vehicle structure*;
a second gear drive defining a second gear drive axis and having at least a third gear component and a fourth gear component, said fourth gear component in driving engagement with said third gear component and operably engageable *and fixed for rotation* with a second wheel to drive the second wheel about the lateral axis of rotation, *wherein the second gear component has a plurality of drive members spaced about a circumference of the second gear component, one of the drive members received in each circumferential bore*; and
at least one electric motor output having a motor output that is non-concentric with said first and second gear drive axes and that is coaxial with the lateral axis of rotation wherein said motor output is operably coupled to said first and second gear drives to provide a driving input to the first and second wheels.

8. [The assembly as set forth in claim 7] *A drive unit assembly for driving at least two laterally spaced wheels on opposing sides of a vehicle comprising:*
*a first gear drive defining a first gear drive axis and having at least a first gear component and a second gear component, said second gear component in driving engagement with said first gear component and operably engageable with a first wheel to drive the first wheel about a lateral axis of rotation;*
*a second gear drive defining a second gear drive axis and having at least a third gear component and a fourth gear component, said fourth gear component in driving engagement with said third gear component and operably engageable with a second wheel to drive the second wheel about the lateral axis of rotation; and*
*at least one electric motor output having a motor output that is non-concentric with said first and second gear drive axes and that is coaxial with the lateral axis of rotation wherein said motor output is operably coupled to said first and second gear drives to provide a driving input to the first and second wheels;*
*wherein said motor output of said electric motor comprises first and second motor output shafts each being coaxial with the lateral axis of rotation for rotating at a first rotational speed and wherein the first and second wheels rotate at a second rotational speed that is less than said first rotational speed; and*
*wherein said first and second gear drives each comprise an epicycloid gear reduction with said first and third gear components each comprising a non-rotating ring gear and said second and fourth gear components each comprising a drive gear that defines said first and said second gear drive axes, respectively, said drive gear being in driving engagement with said ring gear, and said drive gear being operably coupled to said motor output via a chain and sprocket assembly to receive driving input and operably coupled to the respective first or second wheel to provide driving output.*

*9. The assembly set forth in claim 4 wherein the at least one motor output shaft is nonconcentric with the center bore of the first gear component.*

*10. The assembly set forth in claim 4 wherein the drive members are non-concentric with the circumferential bores.*

*11. The assembly set forth in claim 4 wherein the at least one motor output shaft is configured to drive the first gear component such that an outer circumference of the first gear component rolls against the reaction members and the plurality of circumferential bores react against the plurality of drive members to drive the wheel.*

*12. The assembly set forth in claim 11 wherein the outer circumference of the disc of the first gear component is a scalloped outer circumference that defines a cycloidal profile.*

*13. A drive unit assembly for driving at least two laterally spaced wheels on opposing sides of a vehicle comprising:*
*a first gear drive defining a first gear drive axis and having at least a first gear component and a second gear component, said second gear component in driving engagement with said first gear component and operably engageable and fixed for rotation with a first wheel to drive the first wheel about a lateral axis of rotation;*
*a second gear drive defining a second gear drive axis and having at least a third gear component and a fourth gear component, said fourth gear component in driving engagement with said third gear component and operably engageable and fixed for rotation with a second wheel to drive the second wheel about the lateral axis of rotation; and*
*at least one electric motor output having a motor output that is non-concentric with said first and second gear drive axes and that is coaxial with the lateral axis of rotation wherein said motor output is operably coupled to said first and second gear drives to provide a driving input to the first and second wheels;*
*wherein the first gear drive has a first plurality of reaction members mounted to an internal circumference of a first non-rotating vehicle structure, the first plurality of reaction members fixed relative to the first and second gear components; and*
*wherein the second gear drive has a second plurality of reaction members mounted to an internal circumference* of a second non-rotating vehicle structure, the second plurality of reaction members fixed relative to the third and fourth gear components.

14. The assembly set forth in claim 4 wherein the first gear drive is a cycloid gear drive; and
wherein the second gear drive is a cycloid gear drive.

15. The assembly set forth in claim 4 wherein the first gear drive includes at least one of a cycloid gear drive and an epicycloid gear drive.

16. A drive unit assembly for driving at least two laterally spaced wheels on opposing sides of a vehicle comprising:
a first gear drive defining a first gear drive axis and having at least a first gear component and a second gear component, said second gear component in driving engagement with said first gear component and operably engageable with a first wheel to drive the first wheel about a lateral axis of rotation, the second gear component rotating about the first gear drive axis and fixed to the first wheel for rotation therewith;
a second gear drive defining a second gear drive axis and having at least a third gear component and a fourth gear component, said fourth gear component in driving engagement with said third gear component and operably engageable with a second wheel to drive the second wheel about the lateral axis of rotation, the fourth gear component rotating about the second gear drive axis and fixed to the second wheel for rotation therewith; and
at least one electric motor output having a motor output that is non-concentric with said first and second gear drive axes and that is coaxial with the lateral axis of rotation wherein said motor output is operably coupled to said first and second gear drives to provide a driving input to the first and second wheels.

17. The drive assembly set forth in claim 16 wherein the first gear component is a disc having an outer circumference;
wherein one of the first and second gear components has a plurality of circumferential bores radially spaced about a circumference thereof;
wherein the other of the first and second gear components has a plurality of drive members spaced about a circumference thereof, one of the drive members received in each circumferential bore;
wherein the first gear drive has a plurality of reaction members mounted to an internal circumference of a non-rotating vehicle structure, the plurality of reaction members fixed relative to the first and second gear components; and
wherein the at least one motor output shaft is configured to drive the first gear component such that an outer circumference of the first gear component rolls against the reaction members and the plurality of circumferential bores and the plurality of drive members cooperate to drive the wheel.

\* \* \* \* \*